United States Patent [19]
Bright

[11] 3,887,146
[45] June 3, 1975

[54] AIRCRAFT WITH COMBINATION STORED ENERGY AND ENGINE COMPRESSOR POWER SOURCE FOR AUGMENTATION OF LIFT, STABILITY, CONTROL AND PROPULSION

[75] Inventor: Cooper B. Bright, Cambridge, Md.

[73] Assignee: Rutgers University, New Brunswick, N.J.

[22] Filed: Jan. 11, 1974

[21] Appl. No.: 432,489

Related U.S. Application Data

[63] Continuation of Ser. No. 174,268, Aug. 23, 1971, abandoned, which is a continuation of Ser. No. 831,389, June 9, 1969, abandoned.

[52] U.S. Cl. ........ 244/12 R; 244/42 CC; 244/42 CF
[51] Int. Cl. .................... B64c 29/04; B64c 15/14
[58] Field of Search .... 244/12 R, 12 A, 12 B, 12 D, 244/42 R, 42 C, 42 CA, 42 CB, 42 CC, 42 CD, 42 CF, 42 D, 42 DA, 42 DB, 42 CE

[56] References Cited
UNITED STATES PATENTS

| | | | |
|---|---|---|---|
| 2,406,918 | 9/1946 | Stalker | 244/42 CC |
| 3,070,327 | 12/1962 | Dornier et al. | 244/12 R |
| 3,093,350 | 6/1963 | Wilkins | 244/42 CC |
| 3,139,244 | 6/1964 | Bright | 244/12 B |
| 3,149,805 | 9/1964 | Frey et al. | 244/42 R |
| 3,321,157 | 5/1967 | Turner | 244/42 CD |

*Primary Examiner*—Trygve M. Blix
*Assistant Examiner*—Barry L. Kelmachter
*Attorney, Agent, or Firm*—R. S. Sciascia; P. Schneider

[57] ABSTRACT

Vertical and short take-off and landing (V/STOL) aircraft has at least one structural element which is an inflatable gas storage compartment rechargeable with compressed air from the engine compressors. This air when used in combination with suction air and compressed air from the engine compressors under control of the pilot produces in the case of vertical take-off and landing (VTOL) air flotation beneath the aircraft initiating vertical lift-off and completing a short hover just prior to the instant of touchdown during landing and during the remaining part of the take-off and landing maneuver augments lift and stability and control by such as enhancing the boundary layer and moving compressed air over the control surfaces. This air when used for short take-off and landing (STOL) flight when speed is below power-on stall can augment lift and stability and control by such as enhancing the boundary layer and moving compressed air over the control surfaces.

19 Claims, 7 Drawing Figures

INVENTOR
COOPER B. BRIGHT
BY Cameron, Kirkam & Sutton
ATTORNEYS

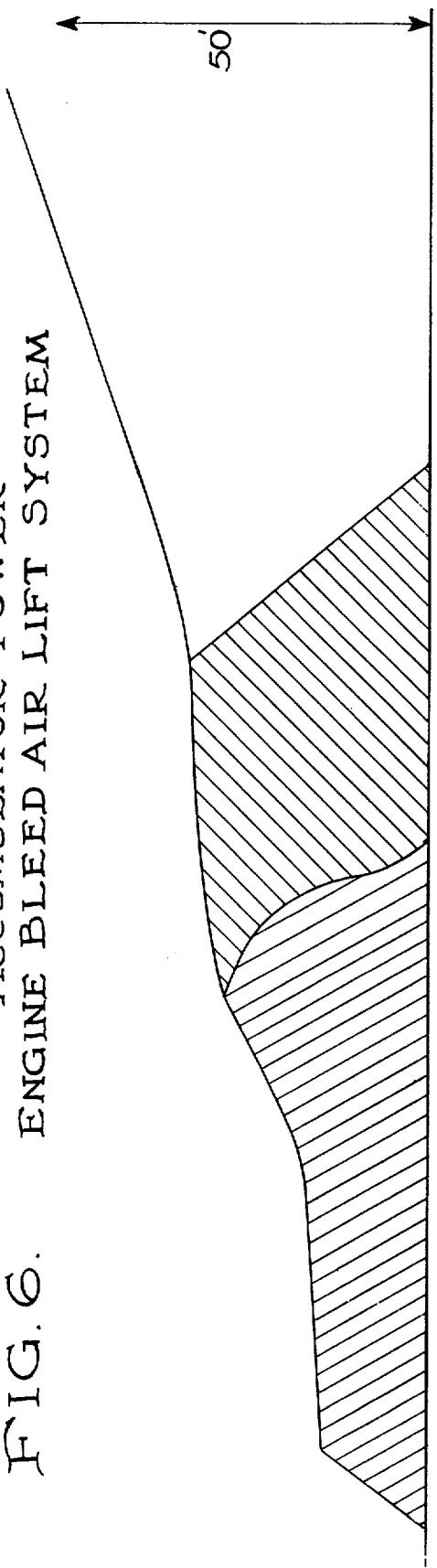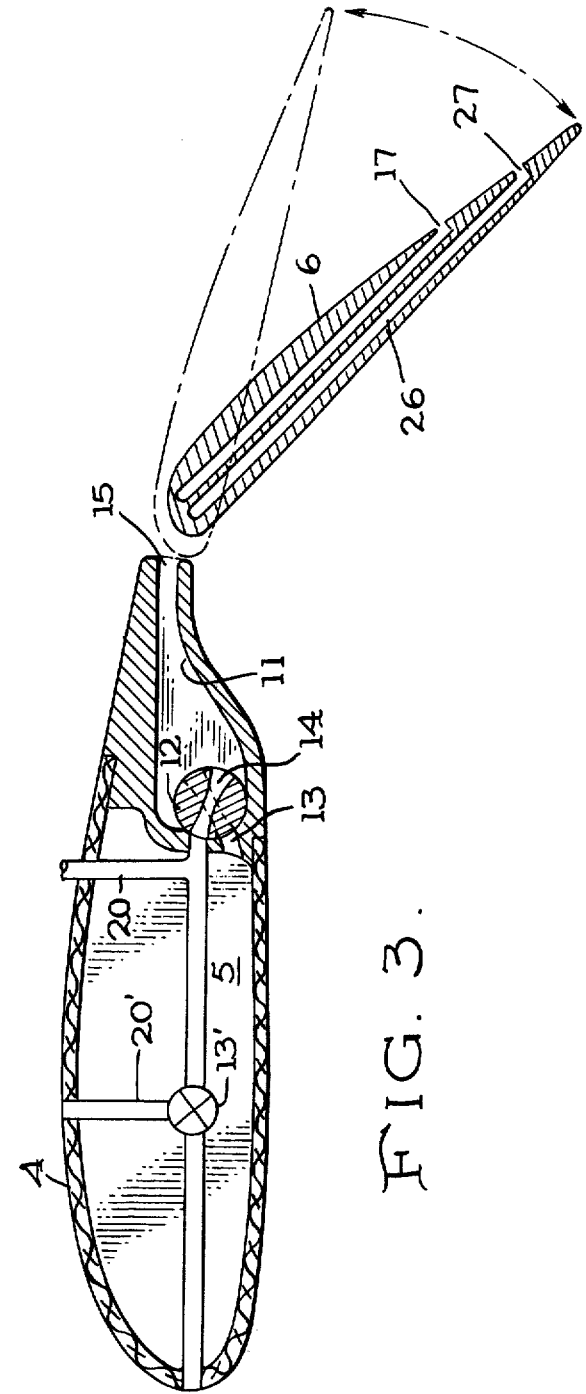

TAKE-OFF DIAGRAM FOR STOL FLIGHT

ZERO GROUND RUN TAKE-OFF

ZERO GROUND RUN LANDING

COOPER B. BRIGHT

Cameron, Kerkam & Sutton

AIRCRAFT WITH COMBINATION STORED ENERGY AND ENGINE COMPRESSOR POWER SOURCE FOR AUGMENTATION OF LIFT, STABILITY, CONTROL AND PROPULSION

This application is a continuation of U.S. Pat. application Ser. No. 174,268, filed Aug. 23, 1971 now abandoned which is a continuation of U.S. Pat. application Ser. No. 831,389 filed June 9, 1969, now abandoned.

BACKGROUND OF THE INVENTION

The present invention relates to vertical and short take-off and landing aircraft in which air under compression from the compressors of the engines is stored within the aircraft in accumulators for use in combination with suction and pressure air from the engine compressors. In the VTOL flight mode the air from the compressors is used to provide a cushion of air beneath the aircraft which lifts the aircraft free of the runway to initiate the take-off and support the aircraft until the air from the accumulator is released to replace the air flotation lift by enhancing the boundary layer and blow over the control surfaces. When this change over to accumulator air occurs the air from the compressors is used for thrust. During the landing maneuver the air from the compressor would be employed to enhance the boundary layer and blow over the control surfaces during flight down the glide path below power-on stall speed and blow over the control surfaces until hover flight is attained immediately prior to touchdown. At this point the compressed air from the accumulator is released to augment the air from the engine compressors to provide air flotation lift. In such a VTOL airplane a conventional landing gear would not normally be required. In the STOL mode of flight, after the compressed air from the engine compressors is used to inflate the accumulator their output of low pressure air is then employed to guarantee the maximum rated thrust can be delivered by the engines. When the airplane has travelled a determined distance down the runway using a conventional landing gear the air from the accumulator is caused to enhance the boundary layer and act upon the control surfaces and place the airplane in flight. During the VTOL landing maneuver the engine compressor air sources are used to inflate the accumulator prior to entering the glide path. During the travel on the path until thrust immediately prior to touchdown, air from the engine compressors augments the aerodynamic lift and stability and control produced by the forward motion of the airplane. When the forward motion of the aircraft is arrested, momentary hover is sustained by both compressed air from the accumulator which is resupplied from the primary bleed compressor and the compressed air from the secondary bleed air compressors providing boundary layer enhancement, stability and control all continuing until touchdown. In the STOL maneuver the engine compressor air sources are used to inflate the accumulator prior to entering the glide path and during the travel on the path to augment the aerodynamic lift and stability and control produced by the forward motion of the airplane. When the point of flare is reached, however, the accumulator can be used to provide air flotation lift and augment air flow over the control surfaces. If the ground effects commences to degrade the lift being provided by boundary layer enhancement, the accumulator air can be used to create air flotation lift until touchdown. In both the VTOL and STOL modes of landing the accumulator provides an added degree of safety in flight by being charged to provide boundary layer enhancement and augment the air flow over the control surfaces in event of engine failure which would cut off both the feed and bleed air sources from the engine compressors. It should be noted that the term "bleed air" in this application refers to air derived from an engine before the air is mixed with fuel and combusted. It does not include exhaust gas from the fuel combustion process.

The present invention may be classified under aeronautics, heavier than aircraft, airplane and fluid sustained with aircraft sustenation, variable lift modification sustaining air foils. In the prior art, U.S. Pat. No. 3,018,034 to Ferri of Jan. 23, 1962; U.S. Pat. No. 3,070,327 to Dornier et al. of Dec. 25, 1962; U.S. Pat. No. 3,080,137 to Hurel et al. of Mar. 5, 1963; U.S. Pat. No. 3,275,270 to Earl et al. of Sept. 27, 1966; and applicant's own U.S. Pat. No. 3,139,244 of June 30, 1964 are considered to be the most pertinent.

The Ferri patent shows that bleed air has been used to augment power of a vertical lift fan. The Dornier et al. patent provides an air cushion under the airplane for landing and take-off purposes with the air for the cushion drawn from above the wings and discharged beneath the wings by a fan which thereafter produces forward thrust during normal flight.

The Hurel et al. patent takes gases from a jet engine for driving a rotor disposed in the wing of an aircraft for vertical lift with subsequent diversion of the gases for forward propulsion.

The Earl et al. patent discloses an aircraft with ground effect landing gear with the cushion provided by gases from turbines. When the aircraft is airborne the compressor outputs augment the propulsion engine outputs. Desired boundary layer air control effect may be provided in any area of the aircraft fuselage to supplement and improve the cushion effect on take-off and landing.

Applicant's patent generally discloses the use of inflatable portions of an aircraft as accumulators for storing air under pressure, in which the accumulator air could be utilized to augment the thrust of vertical lift fans in the wings of the aircraft with the fans driven by the engines of the airplane or utilized effects (Col. 1, lines 21–29 of U.S. Pat. No. 3,139,244).

The prior art does not disclose or suggest the use with conventional take-off and landing (CTOL) and V/STOL airplanes of feed or bleed air from the engines and/or accumulator air in combination for producing air flotation beneath the aircraft, boundary layer enhancement, and augmentation of stability and control, actuation of lift devices and augmentation of thrust all during take-off and landing maneuvers and aircraft maneuvers during flight.

SUMMARY OF THE INVENTION

The present invention relates to a novel concept in aeropropulsion which combines accumulators in the aircraft for storing energy above atmospheric pressure in combination with the suction caused by bleed air being drawn into engine compressor intake ports and pressure caused by bleed air being extracted from engine compressor exhaust port to provide a lifting cushion under the aircraft just prior to take-off and a supporting cushion under the aircraft just prior to touchdown with these compressor gases used to improve the boundary layer such as in a jet augmented flap system. The aircraft is constructed with accumulators as described in applicant's earlier patent, referred to above, in which air under pressure greater than atmospheric pressure is stored for use at the discretion of the pilot. By combining the accumulator power and compressor air it is possible to provide air flotation for initial lift-off with a zero ground run take-off capability as well as a significantly reduced runway length now required for STOL airplanes. The accumulator power which is usually initiated at a point in the forward travel when its flow over the aerodynamic lifting surfaces will not create unfavorable ground effects, will enhance the boundary layer and augment stability and control and will be discontinued when the wing left resulting from forward speed is sufficient to support the weight of the aircraft.

The feed air for the engine compressors or compressors separate from the engine but driven by it may be drawn from the external surfaces of the aircraft and the aerodynamic lift elements of the aircraft, as desired, for preferred boundary layer air control effect for improving flight performance. The accumulator air under pressure may be provided by the aircraft engine compressors prior to take-off or during flight prior to entering the glide path when the fall rated engine power is not being used for flight propulsion. In this manner the bleed air from the engine compressors may be drawn off in required amounts without reducing the engine power required for flight propulsion. The combination of these two power sources augment lift, stability and control and thrust and may be used with both fixed wing and in vertical and short take-off and landing airplanes.

It is therefore an object of the present invention to combine, under pilot control, all the energy creating functions of the propulsion engines in combination with the release of the energy stored in accumulators above atmospheric pressure in satisfying the peak power requirements of the duty cycle during CTOL and VSTOL maneuvers so that both units of the combination will complement each other and not in any way degrade the capabilities of each unit to separately provide the power for which they were designed and at the required time.

Another object of this invention of combining accumulator power and the energy outputs of the propulsion engines including their basic thrust-producing function, is to permit air being drawn into the engine compressor and the compressed air extracted from the engine compressor exhaust ports to enhance, by suction and blowing the boundary layer over the aerodynamic lifting surfaces, insure stability and control of the aircraft by blowing over the control surfaces during flight under power-on stall speed, insure safe flight by making possible continuous operation of all their functions including control of sink rate during engine-off emergency descent, and provide transient air flotation during take-off, landing, and taxiing maneuvers.

Hazardous and unstable conditions in vertical take-off and landing airplanes are eliminated by use of accumulator power and/or bleed and feed air to provide stability and control by increasing the momentum of the air blowing over the control surfaces of the aircraft while at the same time increasing engine thrust and lift when going through mechanical transition functions.

Another object of the present invention is to provide an air cushion under an aircraft to reduce take-off and ground roll to zero with no special undercarriage system required for landing on hard surfaces or water, to distribute landing shock and pressure loads over a large undersurface area of the fuselage and wings, to make lateral slip landings possible and to provide a ground effect air cushion to permit landing on rough surfaces.

Other objects of the present invention will appear from the following description of one preferred embodiment thereof which may include heating of the air from the compressors and accumulators to increase the thrust value and time the air is available, reduction of temperatures of the air stored in the accumulator when the character of the construction materials used requires it, and flowing of the air as a boundary air layer enhancement at supersonic speeds to increase the time of duration the air is available and also the lift capability of the aerodynamic surfaces.

BRIEF DESCRIPTION OF THE DRAWINGS

A preferred embodiment of the present invention is shown in the accompanying drawings, in which like reference characters indicate like parts, and in which

FIG. 3 is a cross-sectional view of a wing and flap of the airplane of FIG. 1 on the line III—III thereof;

FIG. 6 is a take-off diagram for the aircraft of FIG. 1 using accumulator power to produce air flotation.

DESCRIPTION OF THE PREFERRED EMBODIMENT

Figure 1:
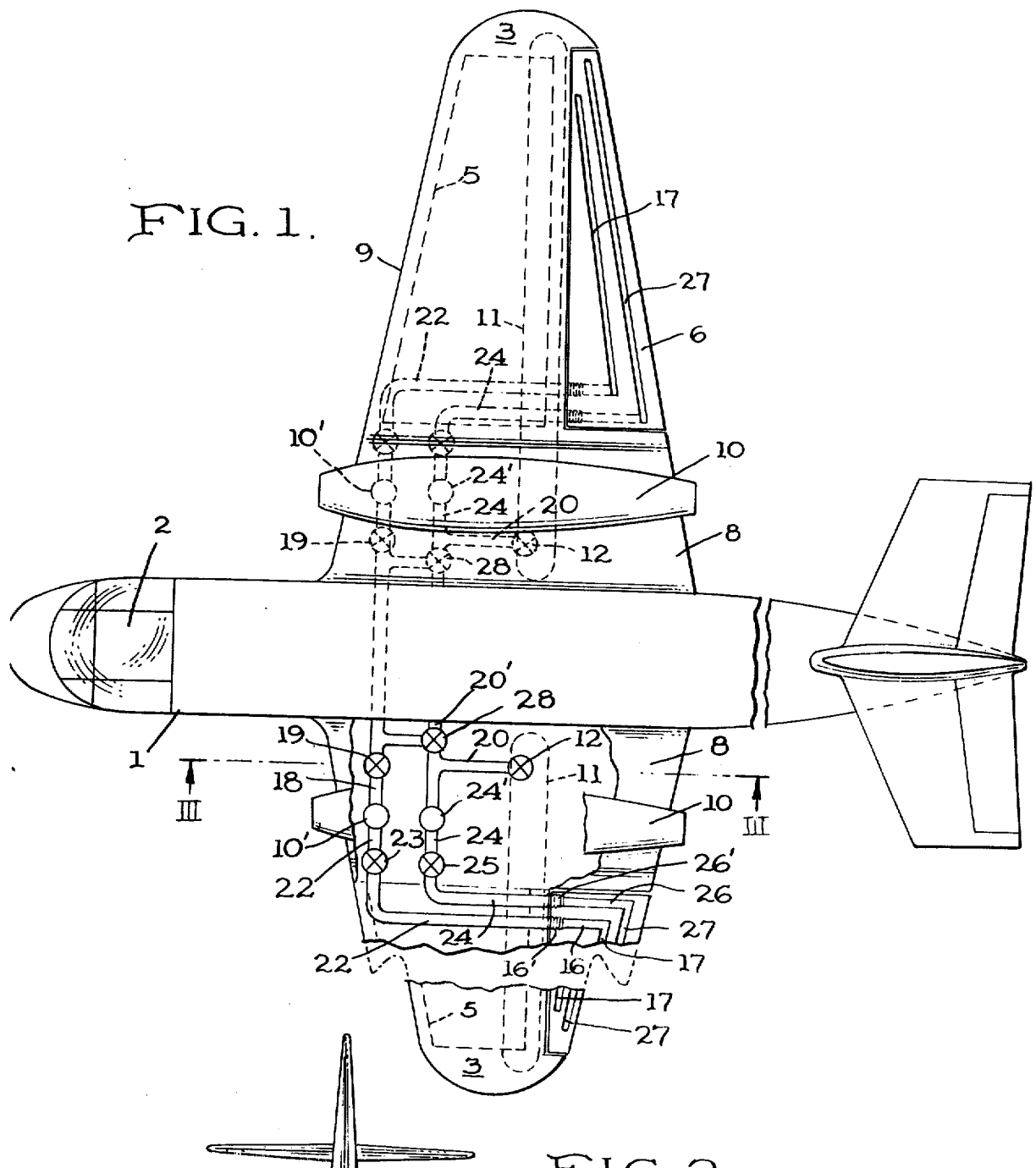
FIG. 1 is a somewhat schematic plan view of an airplane including a preferred embodiment of the present invention.
Figure 2:
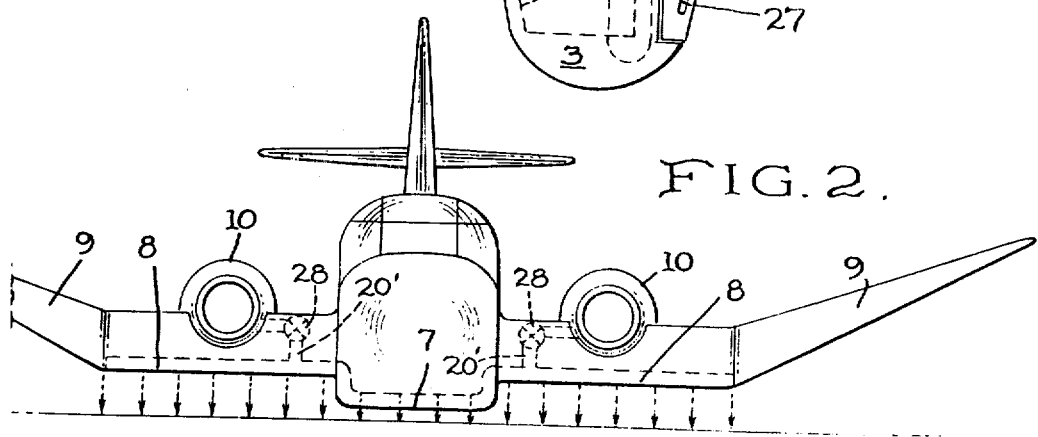
FIG. 2 is a schematic front view of the airplane of FIG. 1 for take-off and landing on air flotation.
Figure 4:
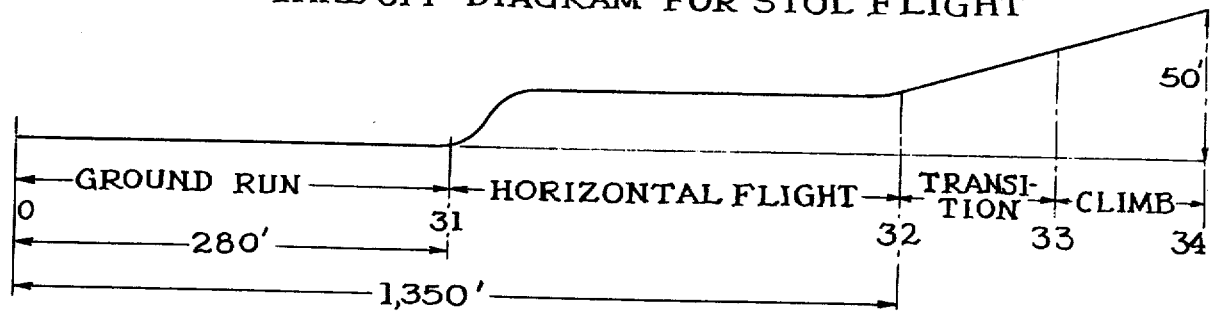
Fig. 4 is a take-off diagram for short take-off and landing flight of the aircraft of FIG. 1.
Figure 5:
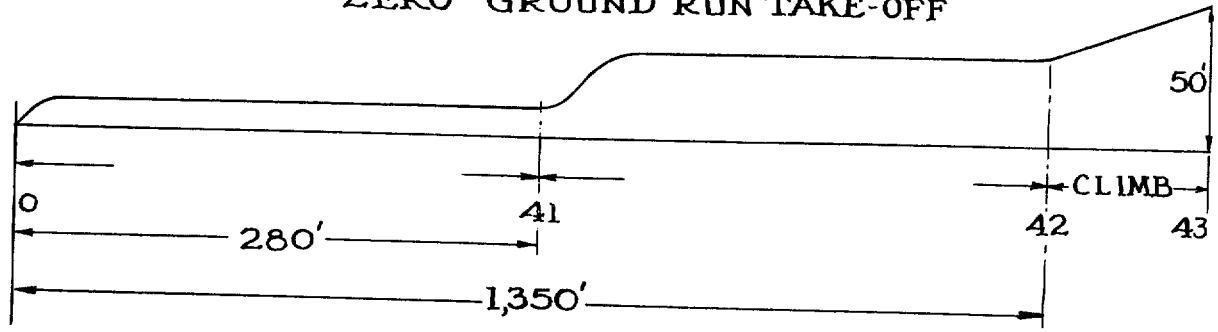
FIG. 5 is a zero ground run diagram for take-off of the aircraft of FIG. 1.
Figure 7:
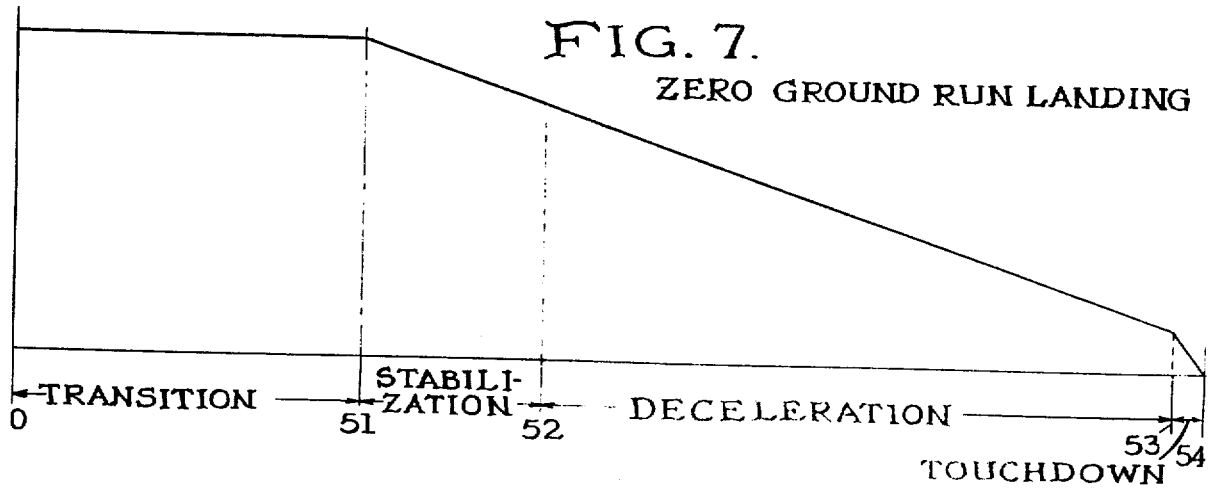
FIG. 7 is a zero ground run landing diagram for the aircraft of FIG. 1.

Referring to the drawings, there is shown in FIG. 1 a plan view of a low wing monoplane equipped with accumulator power in combination with the power outputs from the engines constructed in accordance with a preferred embodiment of this invention. The cutaway section of the drawing discloses the manner in which valves and conduits are arranged to provide control by the pilot of the air pressures generated by the accumulator and feed and bleed air power outputs from the engine compressors that include delivering compressed air in either a short period of time at high value or delayed over a relatively longer period of time at lower value all of which makes possible a wide selection of take-off and landing patterns in both STOL and VTOL operations. Airplane 1, includes a cabin 2 having wings 3 extending laterally therefrom. The cabin assembly 2 and the wings 3 are constructed in accordance with the usual rigid airplane construction techniques. Each of the wing sections 3 has a flexible material 4, covering the necessary conventional rib and spar construction which forms inflatable flexible air-tight cells 5 herein called accumulators and as shown in my U.S. Pat. No. 3,139,244, referred to above.

Suitable materials for forming the inflatable sections of the airplane are flexible materials formed of woven fiberglass, Dacron and Nylon fabrics that could be coated on one or both of the surfaces with a waterproof air-resistant material such as rubber or Neoprene in much the same manner as in a tire casing.

Each of the wings 3 includes conventional ailerons 6 with their aileron control elements (not shown) operated from control cabin 2.

As shown in FIG. II, the bottom of the fuselage structure 7 and horizontal portions of the wings 8 have outlet slots through the bottom surfaces to direct streams of air downwardly as jets with peripheral side covers for the areas shown by the dotted line. With this construction when the airplane is approaching a landing it may be flown near to the landing surface, and as it sinks toward the surface and just prior to the time the fuselage would otherwise come into frictional contact with the surface, the jets of air will create air flotation, or an air cushion, under the fuselage and horizontal wing sections 8. This air flotation and reaction against the fuselage and wing sections assumes the vertical support of the aircraft and its load. Incidental to a landing, upon completion of the transition from airborne to the air flotation support regime, the forward motion of the airplane may be braked by reversal of the aircraft propulsion system, or by the lowering of friction brake devices against the landing surfaces, or by any other preferred suitable means. When the aircraft has been brought to a halt while still being suspended (by a matter of inches) above the landing surface, it may then be taxied in the manner of a conventional "ground effects machine."

Take-off maneuvers are effected by reversal of these procedures. After the accumulators have been charged, the airplane is elevated by the jets fed from the engine compressors into an air flotation or "ground effect" regime with the primary thrust component then brought into action to thrust the aircraft into forward speed. This initial take-off run is facilitated because of the friction-free relationship of the craft to the landing surface. When the forward speed has reached a velocity where, if the relatively high velocity air from the accumulator will not create an unacceptable loss in aerodynamic lift from the wings by inducing ground effects, the pilot causes compressed air from the accumulators to enhance the boundary layer control. The engine compressor air that has been providing air for the jets for air flotation is then diverted, under control of the pilot, to provide thrust, thus enabling the full driving effects of the propulsion engine system of the aircraft to be realized.

In this embodiment of the invention the source of the air supply for the jets for creating air flotation can be from either the accumulators or engine bleed air or both.

As shown in FIG. I in this particular embodiment, the wing structures 8 have outer portions 9 connected to form a dihedral and have attached thereto a pair of turbofan propulsion engines 10 of substantially conventional construction. In addition to providing forward propulsion for the airplane and reverse thrust to retard forward speed for landing, the turbofan engines also serve, first, as a source of compressed air for charging the accumulators and, second, in combination with accumulator power, supply feed and bleed air from the engine compressors to the jets and to enhance the boundary air layer flowing over the aerodynamic surfaces. Enhancement of boundary air layer flow can be by both blowing and suction boundary layers to augment lift, and to act upon the control surfaces to provide stability and control.

Each of the accumulators 5 may receive its compressed air from an outside source prior to take-off or from compressors operated by the airplane engines. In FIG. I a schematic cutaway view is shown of the propulsion and accumulator inflation system. As previously indicated, the forward propulsion means for the airplane are a right and left turbofan engine 10. Air is bled from the primary compressor stage of each of the engines 10 at a duct 18. Duct 10 is connected to the accumulator 5 through control valves 19. Valves 19 are remote control valves which allow the pilot in cabin 2 to regulate the flow of primary bleed air from the engine compressors to the accumulators. By opening and closing valves 19 either the left-hand engine or the right-hand engine or both may be used to inflate the accumulators.

Each of the wings 3 may have 70 percent of their interior volume occupied as accumulators and filled with compressed air. By substituting fabric materials for metal wing coverings and engineering their inflated burst load for a low value and then compressing air into the fabric accumulator greatly in excess of this value for duration times required for take-off and landing power is generated when the air is released that does not increase the cruise weight of the airplane and consequently constitutes essentially a weightless power source. The interior of the wings are configured as shown in FIG. 3. The interior of accumulator 5 holds compressed air which can be directed, by rotating valve 12, to flow fluid into conduit 11 extending along the rear edge of the wing when openings 13 and valve opening 14 coincide. Conduit 11, which opens along the span of the wing's trailing edge is configured with a slot orifice 15 through which the compressed air passes to flow over flap 6 which causes boundary layer enhancement to augment wing lift. If it is desired to add primary bleed air to the flow of air from the accumulator, valve 19 (FIG. 1) can be positioned by the pilot so that bleed air is continuously discharged into accumulator 5 (FIG. III). The compressed air then passes from the accumulator into conduit 11. The air from the accumulators may be discharged from the leading edge, half chord position or any other suitable positions on the aerodynamic lifting surfaces of the airplane through conduit 20' and valve 13'. That will maximize the boundary layer enhancement and be adaptable to the limitations posed by the structure.

When valve 12 is positioned, as shown in FIG. 3, secondary bleed air from the engines can be directed by the pilot adjusting valve 12 to flow air through conduit 20, FIG. 1, through valve 12, FIG. 3, into conduit 11 and out of slot 15 to blow over flap 6 which augments the wing lift.

In FIG. 3 conduit 11 is shown with an orifice 15 which runs the length of the span of the wing along the trailing edge.

Conduit 22 connects the feed air port 10' from the primary engine compressors as shown in FIG. I, through pilot control valve 23 to conduit 16 (FIG. I) through a flexible connection 16' located in flap 6 to slot 17 which runs the length of the flap span. The suction created by the primary engine compressors causes air to be drawn into slot 17 which increases the momentum of the air blowing out of orifice 15 (FIG. III). When flap 6 is operating in ground effects with this suction boundary air layer in operation the momentum of the jet stream passing downward from the trailing edge of the flap will be reduced and in turn could diminish the recirculate effect of the air blowing over the airfoil around the wings.

Conduit 24 connects the secondary feed air port 24' of the engine compressors through pilot control valve 25, shown in FIG. I, to conduit 26, FIG. III located in flap 6 which connects with slot 27 that runs the full span of the flap. The suction created by the secondary engine compressors causes air to be drawn into slot 27 which increases the momentum of the air blowing out of orifice 15, and to have a similar effect to that described for the suction created at orifice 17. It should be readily apparent that this system of suction and blowing air boundary layer control can be adapted to other aerodynamic surfaces on the aircraft as well as to the side panels of the fuselage at any preferred area thereof and to any preferred degree therefrom, so as to simultaneously provide the required volume of air to the compressors, and at the same time to develop boundary layer enhancement.

The intake of air by the engine compressors not only is used to supply the jets which provide air flotation, but enhances both the boundary layer, and the aerodynamic efficiency of the aircraft fuselage and wings through selective suction boundary air layer control relative thereto. In addition, the thrust and stability and control at flight below power-on stall speeds is augmented.

Valve 28 can be adjusted by the pilot to cause secondary engine bleed air to flow through conduit 20' to be directed downwardly and peripherally through the slots in the bottom of the fuselage structure 7, FIG. II, discussed above, and in the horizontal portions of the wings 8 to create air flotation to support the aircraft above the ground or water surface. Likewise, valve 28, FIG. I, can be adjusted to direct air from the accumulator 5 and/or the primary compressor bleed air to the slots to create air flotation.

The air supply stored in the accumulators 5 may be augmented by use of air heaters. As an example the air temperature in the accumulators could be conveniently raised to 1100° F., from a normal temperature of the air in the accumulators on the order of 60° F. Such an increase in temperature causes the accumulator power to be increased approximately threefold.

Gas coolers, not shown, could also be uses in cases where the temperature of the air would exceed the allowable limits of the material from which the accumulators are constructed.

In addition, the compressed air can be discharged to provide power for auxiliary purposes such as starting engines, etc.

In operating the present invention, the various components are disposed in substantially the positions shown in FIGS. I, II and III. As shown in FIG. I, the main propulsion engines 10 are started and valves 19 are opened to direct primary engine compressor bleed air flow into accumulators 5 through conduit 18. When the pressure in the accumulators reaches, say, 150 p.s.i. the accumulators are completely filled and valves 19 are closed by the pilot.

With the accumulators fully charged, the main propulsion engines are accelerated to maximum power output. Secondary bleed air is then directed by adjusting valve 28 to flow through conduit 20'' and be directed downward through the jets as shown in FIG. II, to provide air flotation under the fuselage 7 and the horizontal sections 8 of the wings to lift the gross weight of the aircraft above the ground or water for a normal horizontal take-off. When clear of the ground the airplane moves foward under influence of the primary thrust from the engines.

When sufficient forward velocity is attained, the aircraft altitude is increased by changing to a nose up attitude. As the airplane reaches the new altitude the compressed air in the accumulator is directed, by turning valves 12 in FIG. III, to flow air into conduit 11 and out through orifice 15 to create a jet flap and augment the aerodynamic lift. As the air from the accumulator is released to flow into conduit 11, valve 28 (FIG. I) is closed and the secondary engine bleed air no longer provides air flotation but passes through the engine to supply forward thrust. When flight above power-on stall speed is attained valve 12 (FIG. III) is turned to stop the supply of compressed air from the accumulators 5 to conduit 11.

Referring now to FIG. IV, this take-off maneuver diagram shows how the compressed air accumulators further reduce the take-off run of fixed wing airplanes. The flight path is shown in four stages, the ground run, horizontal flight, and transition and climb. Analysis has established that an airplane of the DeHavilland Twin-Otter type, not equipped with accumulator power for jet flap augmentation, would regime a ground run extending from point 0 to point 32, a distance of 1350 feet. At point 32, the airplane would take off and climb to clear a 50 foot obstacle at point 34. With the wings converted for use as accumulators that employ about 70 percent of the wing volume, about 165 cubic feet compressed air can be stored for release at the trailing edge of the wing as a jet flap that will augment the lift in a step function fashion at point 31 until the compressed air accumulator is expended at point 32. With lift-off occurring at point 31, the horizontal flight stage is performed a few feet above ground until sufficient acceleration occurs to reach unaugmented flight speed. In this manner the use of accumulator power reduces the normal ground run form 1350 feet to about 280 feet. This flight between points 31 and 32 is favored since the gross weight of the airplane at start of take-off is reduced as the air stored in the accumulators is exhausted to the atmosphere. During this portion of the flight the compressed air from the accumulators also acts upon the control surfaces of the airplane to provide stability and control.

At low speeds below power-on stall, from the start of lift-off and until flight above power-on stall speed is attained, the air supply into the engine feed air intake compressors could be drawn from the external flap surfaces, as shown in FIGS. I and III. This causes a suction in the slots in the flap, as shown in FIG. III, which in turn increases the momentum of the air blowing as a jet flap which augments the lift of the wings.

To attain a zero ground run take-off, as shown in FIG. V, the flight path is taken in two stages: flight between points 0 and 41 when the aircraft is supported in flight by air flotation generated by engine compressor bleed and feed air and flight between points 41 and 42 when the airplane is supported in flight by accumulator power. At point 42 the transition to normal flight will have been completed as the gross weight of the airplane becomes supported by the aerodynamic lift from the wings resulting from forward flight. Climb can be started at point 42 to clear a 50 foot obstacle at point 43.

In conventional fixed wing aircraft operations, the ground run extends from point 0 to take-off at point 42 in FIG. V, a distance of 1350 feet. When using accumulator power the ground roll can be reduced to 280 feet extending between points 0 and 41. Employing accumulator power in combination with engine bleed air the take-off occurs at point 0. The lift-off is accomplished by projecting secondary engine bleed air downwardly through conduits to the jets in the underside of the fuselage and in the horizontal sections of the wings to impinge against the land or water surface relative to which the airplane is taking off which supports the airplane in air flotation until point 41 is reached. By providing air flotation under the horizontal sections of the wings, the area supported by air flotation will be the maximum and stability along all axis of the airplane will be provided. While the airplane is thus supported by air flotation, primary engine bleed air provides the forward thrust. The air flotation altitude at which the aircraft flies from point 0 to point 41, is proportional to the flow per unit of perimeter and also to the secondary engine bleed air capacity.

As point 41 is reached, the momentum of the moving airplane will allow it to be directed into a climb to gain altitude at which compressed air used in a jet flap system can create wing lift without being two adversely affected by ground effects. During this short period of travel to gain altitude, the secondary bleed air is redirected from air flotation to forward thrust. At the same time, the compressed air from the accumulators is released to flow from the trailing edge of the wings to provide jet flap lift. This exchange of air pressure sources is shown by the cross hatched area representing secondary bleed air and the area indicating accumulator power in FIG. VI. From point 41 to point 42 in FIG. V, the aerodynamic lift generated by the forward speed of the airplane is augmented by accumulator power used to enhance the boundary layer. At point 42 accumulator power is no longer required as the speed of the airplane exceeds power-on stall speed. The altitude of the airplane is sufficient so that the jet flap air from the accumulator will not produce ground effects that seriously reduce wing lift. In addition, from the start of lift-off and until flight above power-on stall speed is attained, the feed air supply into the engine compressor intake ports will be drawn from the flap, as shown in FIG. III, and from the aircraft fuselage for improving flight performance.

Having attained cruise flight speed beyond point 43, FIG. V, it should now be evident that the energy creating functions of the propulsion engines in combination with the release of the energy stored in accumulators above atmospheric pressure can be employed to provide improved in-flight maneuvering such as smaller diameter turning circles, etc., flying at higher angles of attack than normally possible without boundary layer enhancement or direct jet thrust, increased ascent rate by lift and thrust augmentation, rapidly reduce flight speed without loss in altitude, stability and control, and short powerful bursts of thrust to increase or decrease airplane speed.

In conducting the STOL landing maneuver, primary engine bleed air is controlled by the pilot to charge the accumulators prior to entering the glide path in landing. As the airplane enters the glide path, the flight speed will be reduced to power-on stall speed and the accumulator air will be released to form a jet flap and to blow upon the control surfaces. This enhancement of the boundary layer using only compressed air from the accumulator will permit speed to be reduced below power-on stall until touchdown occurs. The 1340 feet ground roll normally required in landing can be reduced by using accumulator power to about 565 feet. Engine thrust reversers can be employed to arrest forward flight during this landing maneuver. During this landing maneuver, the supply of feed air into both the primary and secondary engine compressors can be drawn from the external surfaces of the aircraft for improving flight performance as was done in the take-off maneuver.

In conducting the VTOL landing maneuver the flight path in landing using accumulator power in combination with bleed and feed air is made up of four stages, as shown in FIG. VII. These four stages are the transition stage from point 0 to point 51, during which the accumulator is fully charged from primary engine bleed air and the flaps are lowered; the stabilization phase from point 51 to point 52 where transients are eliminated that arise in the transition to allow "getting set" for the exacting final phase of the landing; deceleration from point 52 to point 53 during which a constant attitude is maintained as the airplane flies below power-on stall speed until a zero ground run speed is reached just prior to touchdown; and the touchdown from point 53 to point 54 at about zero forward speed.

The landing maneuver is initiated at the start of the transition stage when the flaps are lowered and primary bleed air has completely filled the accumulators. This is followed by secondary engine bleed air being directed to produce a jet flap to augment the aerodynamic lift produced by the wings. During this phase the feed air for the engine compressors is drawn through orifices 17 and 27 shown in FIG. III to cause an increase in the momentum of the boundary air layer moving over the wings and flaps. Angle of attack and attitude of the airplane is adjusted for the lift and thrust forces resulting from operation of the jet flaps before entering the stabilization phase.

In the stabilization phase, transients arising in the transition and final adjustment of the constant angle of attack to be flown during the deceleration phase will be made.

The deceleration phase commences as the airplane speed falls below power-on stall. As aerodynamic lift created by the forward speed of the airplane decreases and stability and control becomes less positive, compensation is provided by directing secondary engine bleed air to enhance the boundary air layer and to act upon the controls to assure the necessary stability.

From the commencement of the deceleration phase and until zero speed is reached as the aircraft hovers just prior to touchdown, the speed of the airplane is below power-on stall but the momentum of the air flowing over the aerodynamic lifting surface is above stall. The control surfaces being acted upon by this augmented air flow are responsive to the requirements for stability and control even when hovering just prior to touchdown. During the deceleration phase drag is produced by the pilot controlling the engine thrust reversers. Thus, during deceleration the pilot applies reverse (braking) thrust, and while slowing down controls height by adjusting engine feed and bleed air supply to increase or decrease the lift augmentation over the aerodynamic lifting surfaces. During the deceleration phase of the flight, because the accumulators remain full, compressed air is available to provide the required lift, and stability and control, if needed, to allow a safe landing should engine failure occur.

At the end of the deceleration phase the forward ground speed is zero and ground effects from recirculation of the air about the wings begin to seriously degrade the jet flap thrust. The touchdown phase from point 53 to point 54, FIG. VII, is initiated when the pilot directs the compressed air from the accumulators through the jets to be projected downwardly against the land or water surface upon which the aircraft is landing, to provide air flotation lift. As the air in the accumulators is released during the touchdown phase to provide air flotation lift, the gross weight of the airplane is reduced equal to the weight of the compressed air being exhausted. During this final phase of the flight, the secondary bleed air can continue to blow over the aerodynamic lifting surfaces or be directed below the fuselage to augment air flotation. Because the primary bleed air is no longer required for propulsion, it could be directed to flow into the accumulator to replenish the compressed air as it is exhausted to provide air flotation. Likewise, compressed air to blow over the control surfaces could be supplied from the secondary bleed air or from the accumulators.

After touchdown the discharge of compressed air from the accumulators is stopped by pilot operated controls and secondary bleed air is directed downward to provide air flotation for taxiing purposes.

The use of air flotation for VTOL insures that impact shocks can be absorbed with minimum force being transmitted to the air frame structure as pressure loads are distributed over a large underside area of the fuselage thereby supporting the airplane in an improved load distribution manner. This eliminates the need for structural concentrations in the air frame such as are required to transfer the stresses generated by conventional type landing gear systems. This results in considerable overall weight savings and reduced "foot pressure" when the aircraft is finally resting on the landing surface. In turn, air flotation eliminates the hazards of rupturing the aircraft structure in event of emergency landings on rough water and, after ditching on water, will operate as a ground effect vehicle until reaching a position of safety. This feature also enables airplanes to take off and land with ease and facility and with a higher degree of safety from runways made of snow, ice, soft surfaces, and only generally level and otherwise unprepared land surfaces. The VTOL operations from bodies of water will not require the aircraft air frame to embody the structure of conventional amphibian or flying boat type aircraft.

I claim:

1. A V/STOL aircraft comprising an airframe, a source of fluid under pressure on said airframe, at least one structural element of said frame forming a fluid storage accumulator for storing fluid under pressure for limited-duration use during landing and take-off at and below unaugmented power-on stall speeds, said source of fluid under pressure deriving said fluid from other than the exhaust gases from the aircraft's fuel combustion, first pilot-controlled valve means for supplying fluid under pressure from said source to said accumulator, second pilot-controlled valve means in the aircraft for supplying fluid under pressure from said accumulator and from said source for limited-duration augmented wing lift on landing and take-off below unaugmented power-on stall speeds by increasing the momentum of the boundary layer, and third pilot-controlled valve means for selectively directing fluid under pressure from said accumulator and from said source through a plurality of openings beneath the airframe portion in closest proximity to the ground for providing air flotation for limited-duration on landing and take-off at and below unaugmented power-on stall speeds, said second pilot-controlled valve means further directing fluid under pressure over surfaces of the aircraft for creating lift and aircraft stability control and for thrust during landing and take-off at and below unaugmented power-on stall speeds whereby the aircraft may perform short take-off and landing and vertical take-off and landing.

2. An aircraft as described in claim 1, including aircraft engines, compressors driven by said engines, said compressors supplying said fluid under pressure to said accumulator and to said second pilot-controlled valve means and duct means opening through external surfaces of the aircraft connected to the intakes of said compressors drawing fluid from the surfaces of the aircraft for aerodynamic lift and control for short duration during land and take-off at and below unaugmented power-on stall speeds.

3. An aircraft as described in claim 1, including aircraft engines, said second pilot-controlled valve means removing bleed air from said engines forming a compressed fluid source and duct means connected to said compressed fluid source to said first pilot-controlled valve means and to said third pilot-controlled valve means.

4. An aircraft as described in claim 1, including wing structures, flaps on said wing structures, and a slot in each of said wing structures opening toward the adjacent one of said flaps, said second pilot-controlled valve means directing said fluid under pressure over said flaps to augment wing lift and to provide control for short duration during landing and take-off at and below unaugmented power-on stall speeds.

5. An aircraft as described in claim 1, including wing structures, flaps on said wing structures, slots in the upper trailing surfaces of said flaps and pilot-controlled valve means for drawing air through said slots from the upper surfaces of said flaps.

6. An aircraft as described in claim 1, including wing structures and pilot-controlled valve means for selectively directing said fluid under pressure for short duration during landing and take-off at and below unaugmented power-on stall speeds through selected portions of the wing structures including the leading edges of said wing structures and through the middle line of said wing structures selectively from said accumulator and said first pilot-controlled valve means.

7. A V/STOL aircraft comprising an airframe, a source of fluid under presssure on said airframe, at least one structural element of said frame forming a fluid storage accumulator for storing fluid under pressure for limited-duration use during landing and take-off at and below unaugmented power-on stall speeds, said source of fluid under pressure deriving said fluid from other than the exhaust gases from the aircraft's fuel combustion, first pilot-controlled valve means for supplying fluid under pressure from said source to said accumulator, second pilot-controlled valve means in the aircraft for supplying fluid under pressure from said accumulator and from said source for limited-duration augmented wing lift on landing and take-off at and below unaugmented power-on stall speeds, and third pilot-controlled valve means for selectively directing fluid under pressure from said source through a plurality of openings beneath the airframe portion in closest proximity to the ground for limited-duration air flotation during landing and take-off at and below unaugmented power-on stall speeds, said second pilot-controlled valve means further directing fluid under suction and pressure to enhance the momentum of flow of the boundary layer over the surface of the airframe for decreasing drag, creating lift and stability and control and thrust during landing and take-off at and below unaugmented power-on stall speeds whereby the aircraft may perform shorter take-off and landing and vertical take-off and landing.

8. A V/STOL aircraft having a fuselage, stub wing components attached on a level with the bottom of the fuselage, propulsion engines mounted on said wings, fluid storage accumulators as a part of said wings, pilot-controlled valve means for inflating said accumulators with non-exhaust bleed air from the engines and for storing accumulator air therein for limited-duration use during landing and take-off at and below unaugmented power-on stall speeds, jets opening through the bottom of the fuselage and through the bottom of said wing components in closest proximity to the ground for limited-duration air flotation on landing and take-off at and below unaugmented power-on stall speeds, pilot-controlled valve means for directing non-exhaust bleed air under pressure from the engines through said jets, pilot-controlled valve means for directing accumulator air under pressure from said accumulators through said jets, flaps extending along the trailing edges of said wing components, slots in the trailing edges of said wing components opening toward said flaps, pilot-controlled valve means for directing non-exhaust bleed air under pressure for limited duration on landing and take-off at and below unaugmented power-on stall speeds from the engines and accumulator air under pressure into said slots and over said flaps and pilot-controlled valve means for selectively supplying air under pressure for limited-duration on landing and take-off at and below unaugmented power-on stall speeds from said accumulators and from the engines to portions of the wing components including the leading edges of the wing components and to the middle line of the wing components.

9. An aircraft as described in claim 8 including pilot-controlled valve means for drawing air from the upper trailing surfaces of said flaps to the engines for short duration on landing and take-off at and below unaugmented power-on stall speeds.

10. An aircraft as described in claim 8, said accumulators comprising inflatable flexible airtight cells forming an integral part of the aircraft construction.

11. A V/STOL aircraft having a fuselage, horizontal wing components attached on a level with the bottom of the fuselage, dihedral wing components attached to said horizontal wing components, propulsion engines mounted on said horizontal wing components and compressors for said engines prior to the combustion stage of each engine, fluid storage accumulators in said dihedral wing, component pilot-controlled valve means for inflating said accumulators with bleed air from the compressors and for storing accumulator air therein under pressure for limited-duration use during landing and take-off at and below unaugmented power-on stall speeds, jets opening through the bottom of the fuselage and through the bottom of said horizontal wing components in closest proximity to the ground for limited-duration air flotation during landing and take-off at or below unaugmented power-on stall speeds, pilot-controlled valve means for directing bleed air under pressure from the compressors through said jets, pilot-controlled valve means for directing accumulator air under pressure from said accumulators through said jets, flaps extending along the trailing edges of said dihedral wing components, slots in the trailing edges of said dihedral wing components opening toward said flaps, pilot-controlled valve means for directing compressor bleed air under pressure and accumulator air under pressure into said slots and over said flaps for limited duration during landing and take-off at and below unaugmented power-on stall speeds and pilot-controlled valve means for selectively supplying air under pressure from said accumulators and from said compressors to selected portions of the wing components for limited duration on landing and take-off at and below unaugmented power-on stall speeds including the leading edges of the wing components and to the middle line of the wing components.

12. An aircraft as described in claim 11, including pilot-controlled valve means for drawing air from the upper surfaces of said flaps to the compressors for short duration during landing and take-off at and below unaugmented power-on stall speeds.

13. An aircraft as described in claim 11, said accumulators comprising inflatable flexible airtight cells forming an integral part of the aircraft construction.

14. A V/STOL aircraft comprising an airframe, a source of fluid under pressure on said airframe, at least one structural element of said frame forming a fluid storage accumulator for storing fluid under pressure for limited duration use during landing and take-off at and below unaugmented power-on stall speeds, said source of fluid under pressure deriving said fluid from other than the exhaust gases from the aircraft's fuel combustion, first pilot-controlled valve means for supplying fluid under pressure from said source to said accumulator, second pilot-controlled valve means in the aircraft for supplying fluid under pressure from said accumulator and from said source for augmented wing lift for limited duration during landing and take-off at and below unaugmented power-on stall speeds by increasing the momentum of the boundary layer, said second pilot-controlled valve means directing fluid under pressure over surfaces of the aircraft for creating lift and aircraft stability control and for thrust for limited duration during landing and take-off at and below unaugmented power-on stall speeds whereby the aircraft may perform short take-off and landing.

15. An aircraft as described in claim 14, including aircraft engines, compressors driven by said engines, said compressors supplying said fluid under pressure to said accumulator and to said second pilot-controlled valve means and duct means opening through external surfaces of the aircraft connected to the intakes of said compressors drawing fluid from the surfaces of the aircraft for aerodynamic lift and control for short duration during landing and take-off at and below unaugmented power-on stall speeds.

16. An aircraft as described in claim 14, including aircraft engines, said second pilot-controlled valve means removing bleed air from said engines forming a compressed fluid source and duct means connected to said compressed fluid source to said first pilot-controlled valve means and to said second pilot-controlled valve means.

17. An aircraft as described in claim 14, including wing structures, flaps on said wing structures, and a slot in each of said wing structures opening toward the adjacent one of said flaps, said second pilot-controlled valve means directing said fluid under pressure for short duration during landing and take-off at and below unaugmented power-on stall speeds over said flaps to augment wing lift and to provide control.

18. An aircraft as described in claim 14, including wing structures, flaps on said wing structures, slots in the upper trailing surfaces of said flaps and pilot-controlled valve means for drawing air for short duration on landing and take-off at and below unaugmented power-on stall speeds through said slots from the upper surfaces of said flaps.

19. An aircraft as described in claim 14, including wing structures and a pilot-controlled valve means for selectively directing said fluid under pressure for limited duration during landing and take-off at and below unaugmented power-on stall speeds through selected portions of the wing structures including the leading edges of said wing structures and through the middle line of said wing structures selectively from said accumulator and said first pilot-controlled valve means.

* * * * *